United States Patent [19]

Stratton et al.

[11] Patent Number: 4,977,495
[45] Date of Patent: Dec. 11, 1990

[54] SYSTEM AND METHOD FOR ACCESSING A CACHE MEMORY WHICH IS LOCATED IN THE MAIN MEMORY OF A LARGE DATA PROCESSING SYSTEM

[75] Inventors: William Stratton, Malvern; Carol Wellington, Berwyn, both of Pa.

[73] Assignee: Unisys Corporation, Detroit, Mich.

[21] Appl. No.: 162,396

[22] Filed: Feb. 29, 1988

[51] Int. Cl.⁵ .............................................. G06F 13/14
[52] U.S. Cl. .............................. 364/200; 364/243.41; 364/248.1
[58] Field of Search ... 364/200 MS File, 900 MS File, 364/300

[56] References Cited

U.S. PATENT DOCUMENTS

| | | | |
|---|---|---|---|
| 4,399,503 | 8/1983 | Hawley | 364/200 |
| 4,413,317 | 11/1983 | Swenson | 364/200 |
| 4,476,526 | 10/1984 | Dodd | 364/200 |
| 4,489,378 | 12/1984 | Dixon et al. | 364/200 |
| 4,603,380 | 7/1986 | Easton et al. | 364/200 |

*Primary Examiner*—Michael R. Fleming
*Assistant Examiner*—Debra A. Chun
*Attorney, Agent, or Firm*—Nathan Cass; Robert S. Bramson; Mark T. Starr

[57] ABSTRACT

A system for maintaining a cache in the main memory of a large data processing system for storing many tracks of data received from a large number of disk files where the disk files are non-volatile which is required to store critical customer data. More importantly, the present invention resides in a software system which is a part of the operating system of a large data processing system to maintain this cache.

9 Claims, 8 Drawing Sheets

SYSTEM AND METHOD FOR ACCESSING A CACHE MEMORY WHICH IS LOCATED IN THE MAIN MEMORY OF A LARGE DATA PROCESSING SYSTEM

BACKGROUND OF THE INVENTION

1. Field of the Invention

This invention relates to a cache memory which is a part of the main memory of a large data processing system and more particularly to such a cache memory which is to expedite data transfer to and from the user portion of main memory and peripheral devices such as disk files.

2. Description of the Prior Art

Large data processing systems are used by such institutions as large banks, airlines and so forth to maintain and update customer data such as bank accounts, airline reservations and the like. Such customer data is critical data in that if the system goes down and all the customer bank accounts or all of the reservations are lost, the obvious end result will occur. For this reason, such customer critical data is maintained in non-volatile memory units such as large magnetic disk drives and such large data processing systems may be servicing as many as 200 or more such disk drives so as to constantly update customer accounts in an on-line real-time basis.

However, in such a large data processing system the time to access a data segment from a given disk file or, other peripheral devices, is measured in terms of milliseconds while the actual processing time required for such data update takes only a few microseconds. Furthermore, with such a large number of peripheral devices being serviced which require access to the system's main memory, the I/0 busses can be clogged further delaying transmission time of the required data and thus defeating the throughput capacity of the system itself.

Such disk files are normally provided with a cache memory at its output and whenever a data segment is accessed, the entire track containing that segment is put into the corresponding cache. The philosophy behind this is that when a data segment is requested, subsequent requests will probably be from the same disk track. However, in a large data processing system this does not eliminate the transfer time from the disk to main memory.

The Peacock et al U.S. application No. 926,738 filed Nov. 4, 1986 and entitled "Disk Caching Mechanism for a Multi-Disk Drive System" discloses a system where the disk cache for all the disks in the system is maintained in main memory. Thus, once a data track containing a requested segment has been transferred to the disk cache in main memory, the access of that disk cache can occur in microseconds rather than milliseconds required in previous systems. However, in the Peacock application, a special purpose processor is provided to handle the disk track transfers and also to handle the transfer from the cache in main memory to the user job area of main memory and that this extra computer system adds to the expense of the system and such a system cannot be adapted to previously existing systems.

The present invention is directed towards a software system residing as a part of the operating system in main memory to maintain a disk cache in main memory so that the user job or task sees an increased transfer speed for a data request from a disk when the segment being requested is in a track that has been stored in the cache in main memory.

It is then an object of the present invention to provide an improved large data processing system wherein the transfer time for the access of data segments stored in the periphery can be improved.

It is another object of the present invention to provide an improved software system for maintaing a disk cache for a large number of disk units in a large data processing system.

It is still a further object of the present invention to provide a software system for a large data processing system to decrease the transfer time of data segments from a peripheral disk cache or other peripheral to the processor or processors which are executing user tasks.

SUMMARY OF THE INVENTION

In order to accomplish the above-identified objects, the present invention resides in a system for maintaining a cache in the main memory of a large data processing system for storing many tracks of data received from a large number of disk files where the disk files are non-volatile which is required to store critical customer data. More importantly, the present invention resides in a software system which is a part of the operating system of a large data processing system to maintain this cache. The software system initiates an I/0 operation when the task being executed requires a data request or a data store which operation is governed by parameters provided by the programmer at the beginning of the program or task being executed. At the beginning of such task execution, the processor running the execution sets up a control block for the particular disk unit specified among the parameters provided. The software system then initiates a read operation or a write operation depending upon whether the task being executed is requesting a data fetch or a data store and upon completion of the I/0 operation, terminates it. When a read operation is requested, the software system of the present invention checks the main memory cache to see if that data is in the cache prior to the initiation of the I/0 operation. If the requested data is in the cache it is transferred, improving the access time. If it is not in the cache a new request is made of the disk unit specified, the entire track in which that data segment resides is fetched to main memory for storing in the cache because of the high probability that succeeding data requests will come from the same track. Specific features of the present invention software system are that all write operations are issued to the disk and write hits update the appropriate cache buffers. When a read request misses in the cache, a cache buffer is filled by fetching the track from the disk.

A feature that in the present invention resides in a software system for a large data processing system having a disk cache in its main memory and which data processing system requires a large number of peripheral disk drives to maintain critical customer data.

BRIEF DESCRIPTION OF THE DRAWINGS

The above and other objects, advantages and features of the present invention will become apparent from the following specification when taken in conjunction with the drawings wherein.

GENERAL DESCRIPTION OF THE PREFERRED EMBODIMENT

Figure 1:
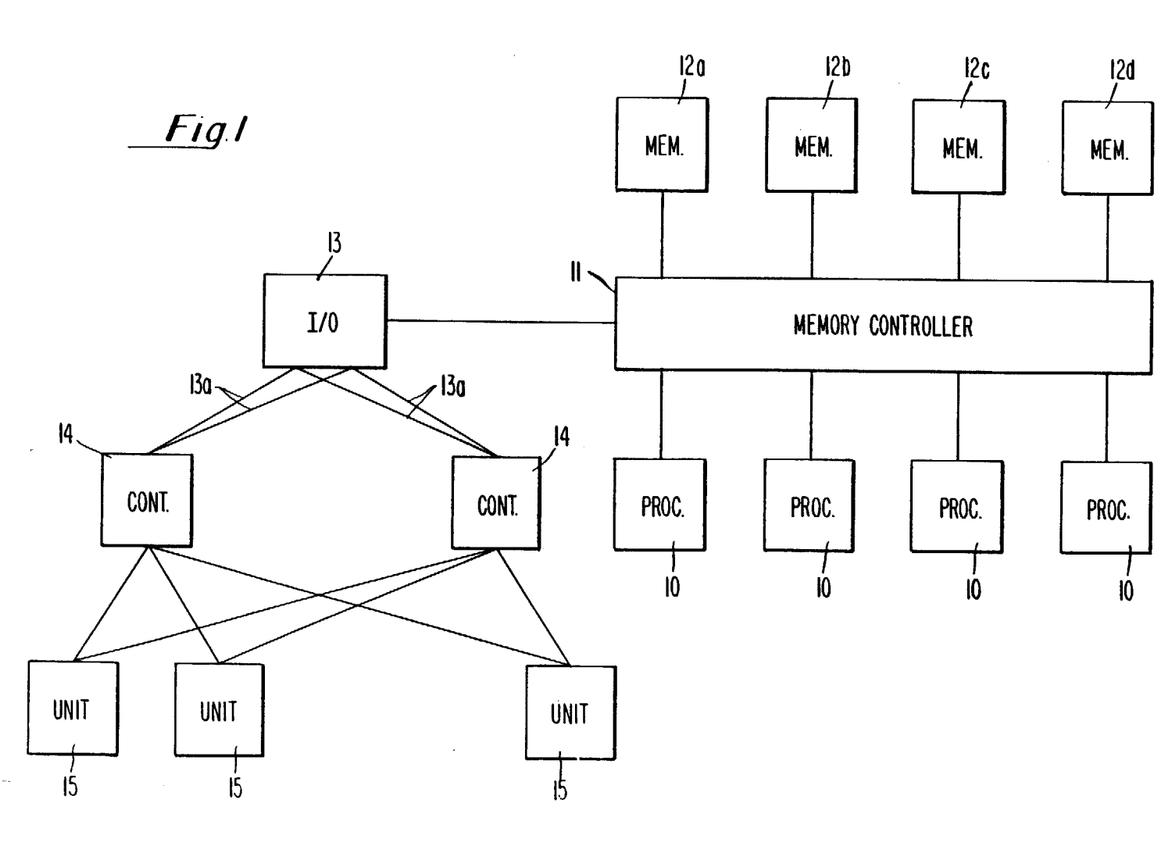
FIG. 1. is a block diagram of a large data processing system such as employed with the present invention.

A large data processing system with which the present invention may be employed is illustrated in FIG. 1. As shown therein, this system is a very large multi-processing system having a plurality of central processors 10 which are coupled to another plurality of main memory modules 12 by way of memory controller 11 which allows any processor to address any memory module.

Such a system may be one which is commercially available such as the Unisys A-15 Large Data Processing System.

More specifically, the present invention resides in a software system which employs I/0 system 13 to control communication and data transfers between peripheral units 15 and main memory modules 12. I/0 system 13 can also communicate with respective central processors by way of memory controller 11.

In general, the data processing system of FIG. 1 is operated under control of a plurality of programs which comprise the operating system of which the present invention is a part. When a given processor begins to execute a given program or task in the user portion of main memory 12, it sets up I/0 control blocks in main memory for each of the peripheral units 15 that are required by that particular task or user program. These control blocks are made up of parameters supplied by the programmer at the beginning of the program or task being executed. When the central processor 10 that is executing a particular user program detects a data request, it checks main memory and, if the data requested is not in main memory, it initiates an I/0 operation by transferring the relevant I/0 control block to I/0 system 13 for transmission to the specified peripheral unit. When the I/0 operation has begun, the task requesting that operation is put in a wait state and the central processor is relieved and assigned to another user program or task. When the I/0 process has been completed, the user program or task which requested it is again scheduled by the operating system as available for execution by the next available central processor 10.

The present invention is the provision within main memory modules 12 of a disk cache area since a large data processing system of the type illustrated in FIG. 1 may require a large number and even hundreds of peripheral disk drives for the non-volatile storage of critical user data and the purpose and object of the present invention is that, when a data segment is requested from a specified disk, the entire track in which that data segment resides is retrieved for storage in the main memory disk cache. This is done since it is quite probable that subsequent data requests will be from the same track and the time required to access a particular disk every time is eliminated.

Figure 2:
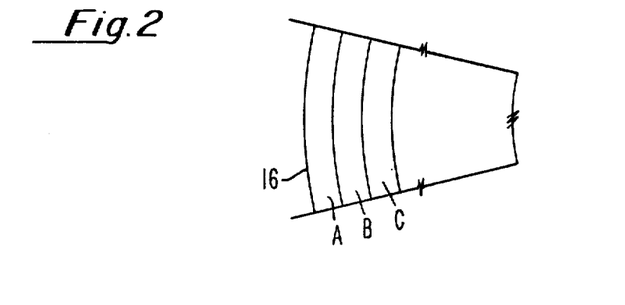
FIG. 2. is a plan view of a portion of a disk illustrating the arrangement of data tracks therein.

FIG. 2 is provided for those not familiar with disk drive mechanisms which are non-volatile and in the form of a magnetic circular disk where data is stored in a series of tracks illustrated in FIG. 2 by the letters A, B and C, and so forth. Because of the major storage requirements for the I/0 transfers, a goodly portion of main memory is assigned for such I/0 operations. Thus, in FIG. 1, memory module 12a may be assigned as the I/0 work area for storing I/0 control blocks as described above, then memories 12b and 12c would be assigned as the disk cache while the remaining memory modules would be assigned to user programs and data.

The present invention resides in software system or package that is added to the many programs that make up the operating system of the data processing system. The operating system is responsible for all of such "houskeeping" chores as program or task scheduling, handling I/0 interrupts and so forth. When a user program being executed by a central processor in the data processing system requires a data fetch from memory and that data is not in memory, then the present invention is activated when the data segment requested resides in a disk file as would most likely be the case in a large data processing system having many high-speed disk files.

As was described above, the present invention maintains a disk cache in main memory for all the various disk files in the system and its advantage is that it eliminates the transfer time for most disk file fetches by the I/0 system which transfer time can take many milliseconds while the transfer time from one portion of main memory to another portion of main memory can be measured in microseconds.

The cache is established when the user reconfigures to a group with a cache declaration. The requested number of memory pages are signed and marked as belonging to the cache during memory establishment in the same as memory disk pages. Once the cache is established the user designates the units to be cached by using a new command.

The specific routines employed in the software system of the present invention are the I/0 initiation, a read operation, a write operation, and an I/0 termination operation. In order to make the cache system of the present invention function in an efficient manner, the specific features of the present invention are that all write operations are issued to the disk and write its update to the appropriate cache buffers.

DETAILED DESCRIPTION OF THE PREFERRED EMBODIMENT

Described below are the various routines employed in the present invention. While these routines are actually implemented in a variation of the ALGOL programming language they are listed below in psuedo code language in order to provide a clearer presentation to those not readily fluent in ALGOL.

Initiate I/0

Figure 3:
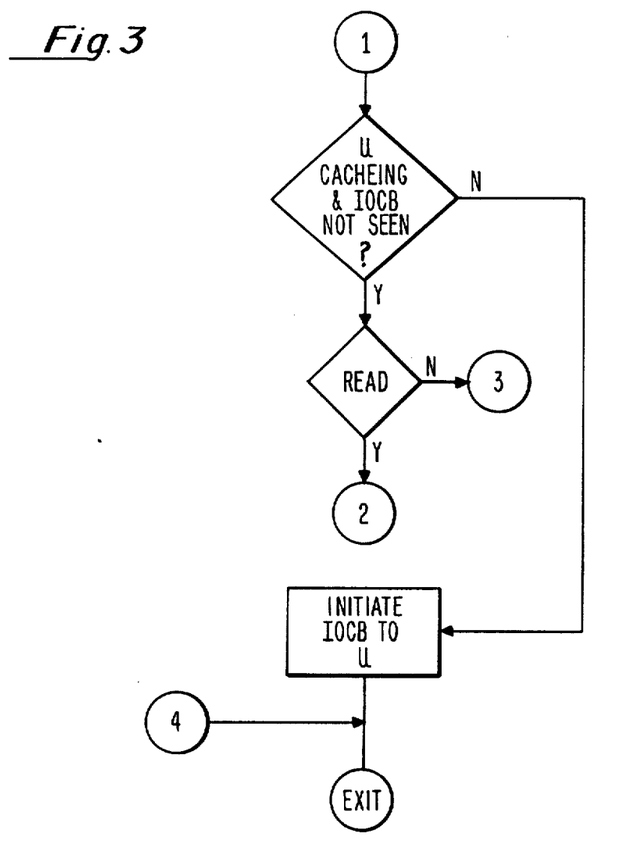
FIG. 3. is a flow diagram illustrating the Initiate I/0 operation for a given disk unit.

As was explained above, when the current user program execution began an I/0 control block was created in memory, which control block contains those parameters necessary for the operation of the particular peripheral unit prescribed, in this case a disk file. A flow diagram briefly illustrating the initiate operation is illustrated in FIG. 3.

Figure 4:
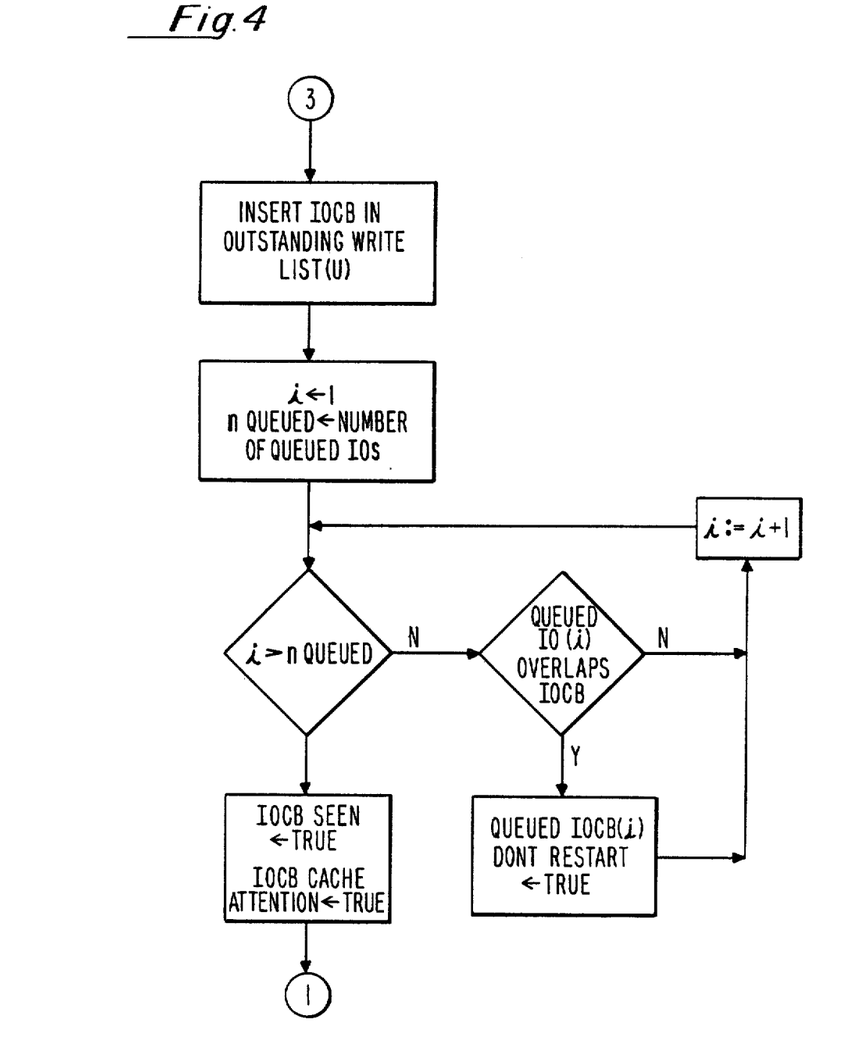
FIG. 4. is a flow diagram of Write Initiation as employed in the present invention.
Figures 5, 5A:
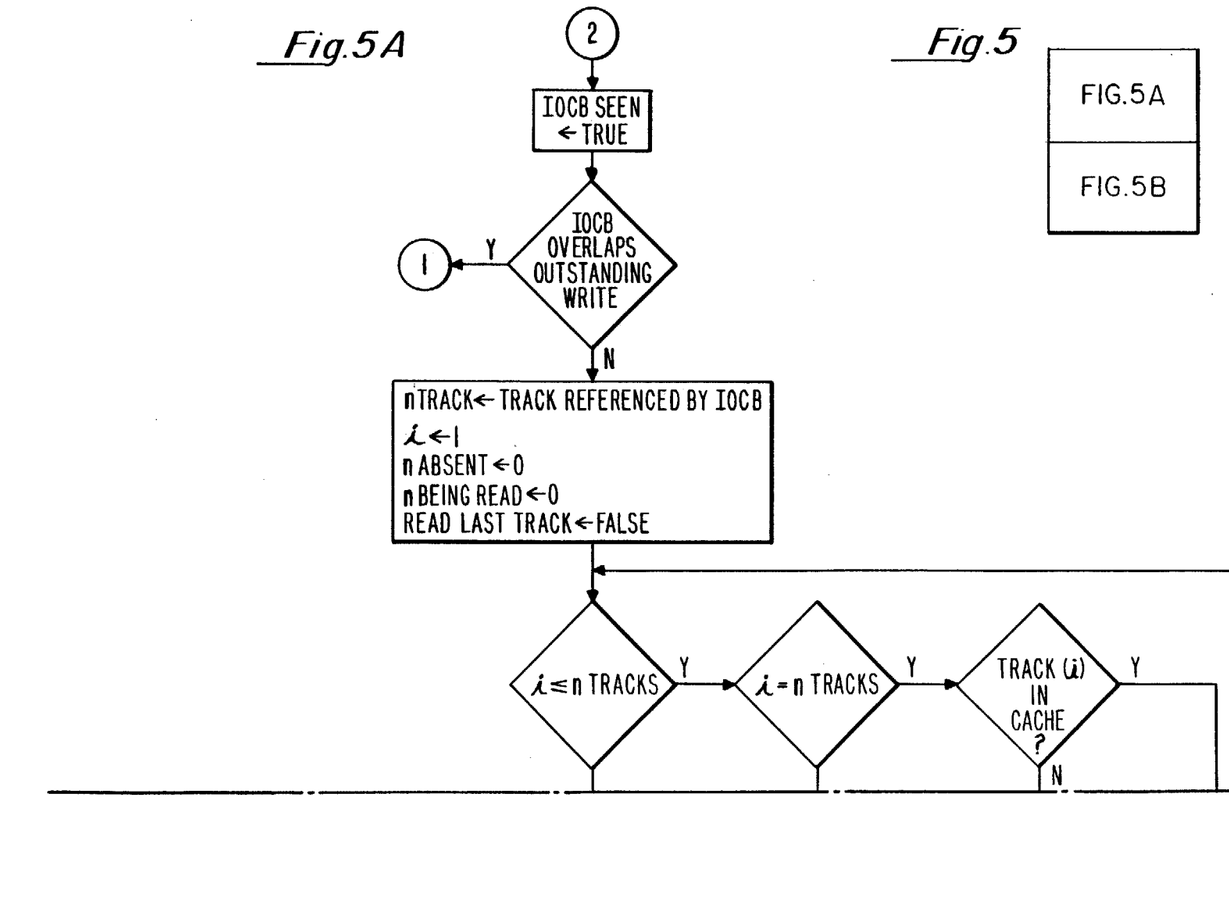
FIGS. 5, 5A & 5B are a flow diagram for the initiation of a read operation from the specified disk to the disk cache of the present invention.
Figure 5B:
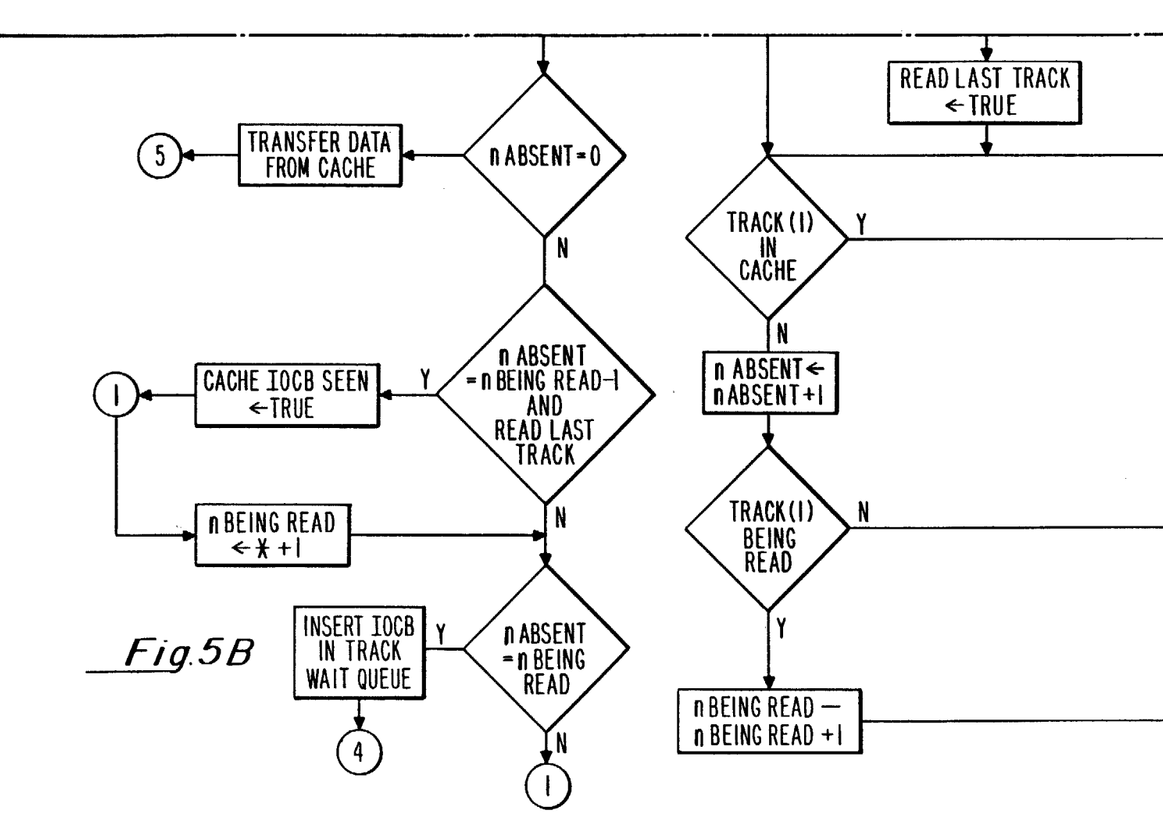

When an I/0 operation is requested, the initiate I/0 is invoked which first determines whether or not the designated disk unit is currently cacheing and whether the I/0 control block for that unit has already been serviced by the cache. In the latter case, the initiate I/0 routine has been called recursively by the cache routine. If either situation exits, then the routine branches to initiate that I/0 control block to the disk unit after which the initiate I/0 routine is exited. Otherwise the I/0 request is passed to the cache routine. If it is a write operation, the write initiation routine of FIG. 4 is called. If it is a read operation, read initiation routine of FIG. 5A and 5B is called.

The specific psuedo code listings below are for the write-through and write up-date algorithm. This algorithm is invoked for all cacheable operations to a cached unit. "Cacheable I/0's" are all read and write operations except in certain instances.

Figure 6:
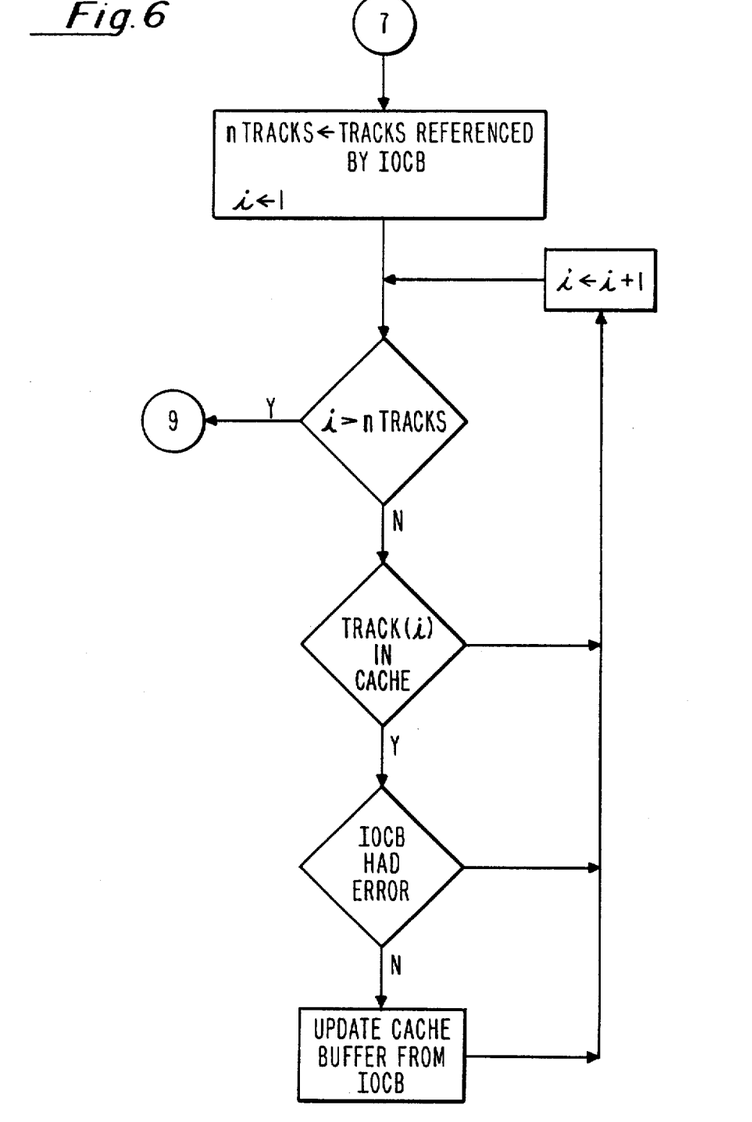
FIG. 6 is a flow diagram illustrating a Write Termination as employed in the present invention.

| WRITE INITIATION (FIG. 4.) |
| --- |
| MARK IO OPERATION 'SEEN BY CACHE' |
| CREATE ENTRY FOR WRITE ADDRESS RANGE |
| MARK ANY WRITES THAT MUTUALLY OVERLAP |
| 'OVERLAPPING' |
| MARK ANY READ JOBS WITH THE SAME START ADDRESS |
| AS |
| 'DO NOT REINITIATE' |
| ISSUE IO WITH CACHE ATTENTION SET |
| READ INITIATE (FIG. 5A & 5B) |
| MARK IO OPERATION 'SEEN BY CACHE' |
| CREATE CACHE JOB |
| CALCULATE TRACKS SPANNED BY REQUEST |
| FROM PACK TYPE, ADDRESS, LENGTH, TAG TRANSFER |
| STEP THROUGH TRACKS |
| SEARCH PAGES FOR TRACK |
| IF PAGE IS PRESENT |
| SAVE PAGE NUMBER |
| INCREMENT PAGE HOLD COUNT |
| SAVE IOCB |
| IF REQUEST OVERLAPS AN OUTSTANDING WRITE THEN |
| INCREMENT READ MISS COUNT |
| FOR EACH PRESENT PAGE |
| DECREMENT HOLD COUNT |
| DESTROY JOB |
| ISSUE IO |
| ELSE |
| IF ALL TRACKS ARE PRESENT THEN |
| INCREMENT READ HIT COUNT |
| INCREMENT USAGE COUNT FOR EACH PAGE |
| TRANSFER DATA TO USER BUFFER |
| FOR EACH PRESENT PAGE |
| DECREMENT HOLD COUNT |
| DESTROY JOB |
| FINISH IO |
| ELSE |
| IF ALL ABSENT TRACKS ARE BEING READ THEN |
| ADD JOB TO EACH TRACK'S JOB LIST |
| ELSE |
| IF LAST TRACK PRESENT OR |
| IO SPANS MORE THAN ONE TRACK THEN |
| INCREMENT READ MISS COUNT |
| FOR EACH PRESENT PAGE |
| DECREMENT HOLD COUNT |
| DESTROY JOB |
| ISSUE IO |
| ELSE |
| IF LAST TRACK IS ABSENT THEN |
| CREATE CACHE JOB FOR TRACK |
| FIND PAGE FOR TRACK |
| SET PAGE HOLD COUNT TO ONE |
| ISSUE CACHE IO WITH CACHE ATTENTION SET |
| IF CACHE IO ISSUED AND |
| IO CONTAINED IN ONE TRACK THEN |
| ADD JOB TO TRACK'S JOB LIST |
| WRITE TERMINATION (FIG. 6.) |
| DESTROY ENTRY FOR WRITE ADDRESS RANGE |
| CREATE CACHE JOB |
| CALCULATE TRACKS SPANNED BY REQUEST |
| FROM PACK TYPE, ADDRESS, LENGTH, TAG TRANSFER |
| STEP THROUGH TRACKS |
| SEARCH PAGES FOR TRACK |
| IF PAGE IS PRESENT THEN |
| SAVE PAGE NUMBER |
| INCREMENT PAGE HOLD COUNT |
| IF PAGE IS 'BEING READ' THEN |
| MARK IO 'OUT OF ORDER' |
| IF IO 'OUT OF ORDER' OR |
| IF IO 'OVERLAPPING' THEN |
| FOR EACH TRACK |
| IF PAGE PRESENT THEN |

Figure 7:
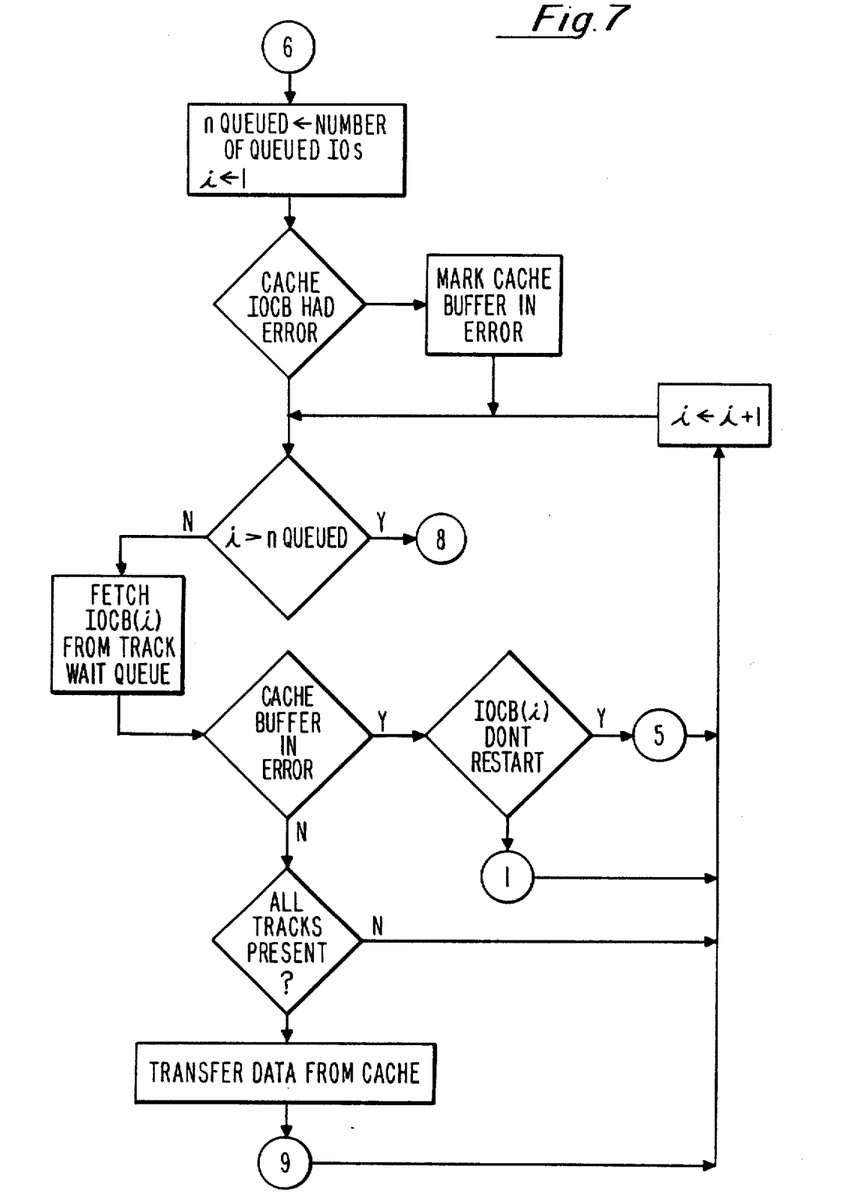
FIG. 7 is a flow diagram illustrating a Read Termination operation as employed in the present invention.

```
-continued
IF PAGE HOLD COUNT IS ONE THEN
    RETURN PAGE AS AVAILABLE
ELSE
    MARK PAGE 'TO BE INVALIDATED'
ELSE
IF IO RESULT IS GOOD THEN
    TRANSFER DATA TO EACH PRESENT PAGE
ELSE
    MARK ALL PRESENT PAGES IN ERROR
READ TERMINATION (FIG. 7.)
RETRIEVE CACHE JOB
IF IO RESULT IS GOOD THEN
    FOR EACH WAITING READ
        REMOVE JOB FROM TRACK JOB LIST
        TRANSFER DATA
        IF ERROR ON DATA TRANSFER THEN
            IF JOB MARKED 'DO NO REINITIATE'
            THEN
                TERMINATE IO WITH ERROR
            ELSE
                INITIATE IO
        ELSE
            COMPLETE IO
    REMOVE JOB FROM TRACK JOB LIST
    COMPLETE IO
ELSE
    FOR EACH WAITING READ
        REMOVE JOB FROM TRACK JOB LIST
        IF JOB MARKED 'DO NO REINITIATE' THEN
            TERMINATE IO WITH ERROR
        ELSE
            INITIATE IO
IF PAGE IS MARKED 'TO BE INVALIDATED' AND
PAGE HOLD COUNT IS ZERO THEN
    RETURN PAGE AS AVAILABLE
INITIATE IO
IF UNIT IS STOPPING THEN
    DECREMENT UNIT TRACK READ COUNT
    IF UNIT TRACK READ COUNT IS ZERO THEN
        RESET UNIT CACHEING
        RESET UNIT STOPPING
        ZERO STATISTICS
```

Figure 8:
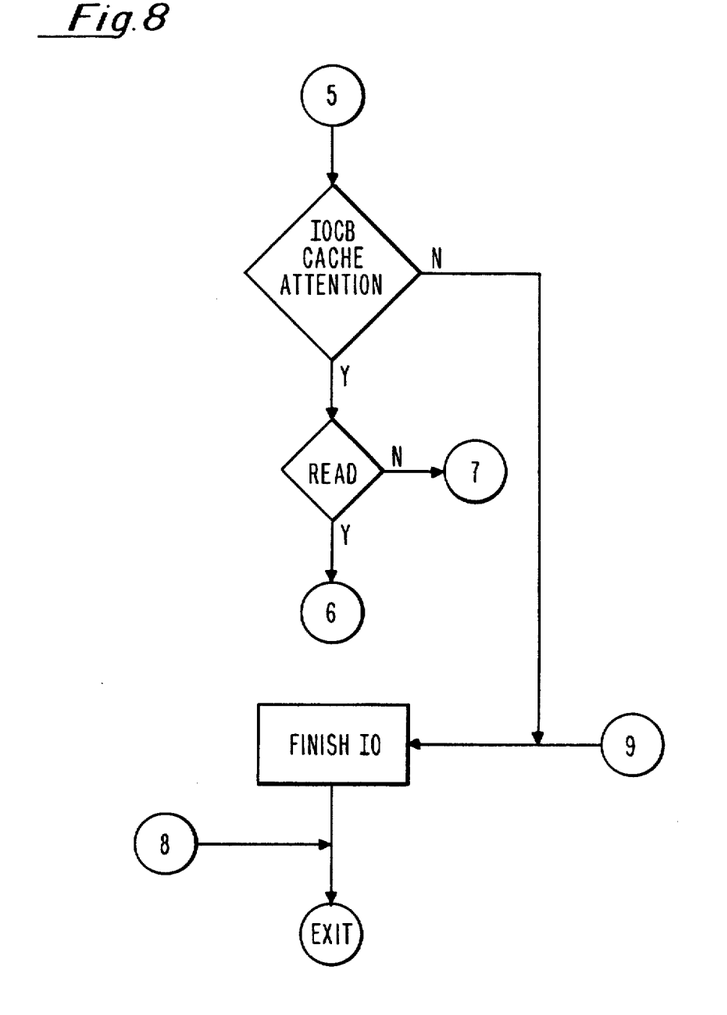
FIG. 8. is a flow diagram illustrating the termination of the I/0 operation.

FIG. 8 is a flow diagram of the Finish I/0 routine of the present invention. This routine is called when the I/0 control block has been marked for cache attention. If it is not the I/0 routine is finished and it exits. This routine is called for by a track read operation when there has been a read miss and all write operations. If the control block has been marked for cache attention, it is again read to see if a read operation is called for in which case the routine exits to the read termination routine of FIG. 6. If it is a write request, then the routine exits to the write termination routine of FIG. 7. It is to be noted from FIG. 6 and FIG. 7 that both the write termination and read termination routine ultimately exits as a finished I/0 operation as indicated in FIG. 8.

EPILOGUE

A software system has been described for the establishment and maintenance of a central disk cache in the main memory of a large data processing system which cache serves all disk units employed in the system. The cache also maintains statistics on its performance such as the number of read hits, read misses, write hits, write misses, transfer time, actual I/0 time, computed I/0 time, (I/0 time that would have been used if there was no cache) number of sectors and number of requests. These statistics are kept for each unit and the cache as a whole.

While but one embodiment of the present invention has been disclosed, it will be apparent to those skilled in the art that variations and modifications may be made therein without departing from the spirit and the scope of the invention as claimed.

What is claimed is:

1. In a data processing system having an operating system, a plurality of disk drives for storing data segments in a plurality of tracks, at least one central processor, and a main memory having a first portion for storing said operating system along with a plurality of tasks to be executed by said at least one central processor which processes require I/0 disk drive operations to occur before their execution can be completed, said I/0 disk drive operations including a read I/0 operation and a write I/0 operation for reading and writing data segments on said disk drives, the improvement comprising:
    programmable means for setting aside a second portion of said main memory as a disk cache area of controllable size for use by a task;
    means providing a software system as part of said operating system, said software system being adapted to control the operation of said disk cache area;
    said software system being operable to initiate an I/0 operation when a task being executed by said central processor requests an I/0 disk drive operation;
    said software system being operable in response to a task requesting a read I/0 operation to search said disc cache area to determine if the requested data segment is stored therein and, if so, to provide the requested data segment to the requested task therefrom and, if not, to fetch the requested data segment from said disc drive for storage in said disc cache area, said software system terminating the I/0 operation when it is completed.

2. The invention defined by claim 1, wherein the entire disk track containing the requested data segment is transferred to said disc cache area.

3. The invention defined by claim 1 further including means in said central processor for establishing an I/0 control block in said main memory for a particular disk drive at the beginning of the execution of a task by said central processor, said control block containing parameters required for the operation of said particular disk drive.

4. The invention defined by claim 3 further including means for transmitting the corresponding I/0 control block to the specified disk drive when the data segment requested by a task is not in said main memory.

5. The invention defined by claim 1 further including means for writing a data segment in said disc cache area as well as in a specified disk drive when a write I/0 operation is requested by a task.

6. The invention defined by claim 1, wherein said programmable means is additionally able to designate which of said disk drives are to be cached.

7. The invention defined by claim 1, wherein said processing system includes a plurality of central processors coupled to said main memory for executing said tasks, each central processor operating as described for said at least one central processor.

8. The invention defined by claim 7 including a memory controller which allows any processor to communicate with said main memory.

9. The invention defined by claim 7, wherein means are provided responsive to a task requesting an I/0 operation for putting that task in a wait state and relieving the central processor which was executing that task for assignment to another task.

* * * * *